Figure 1:
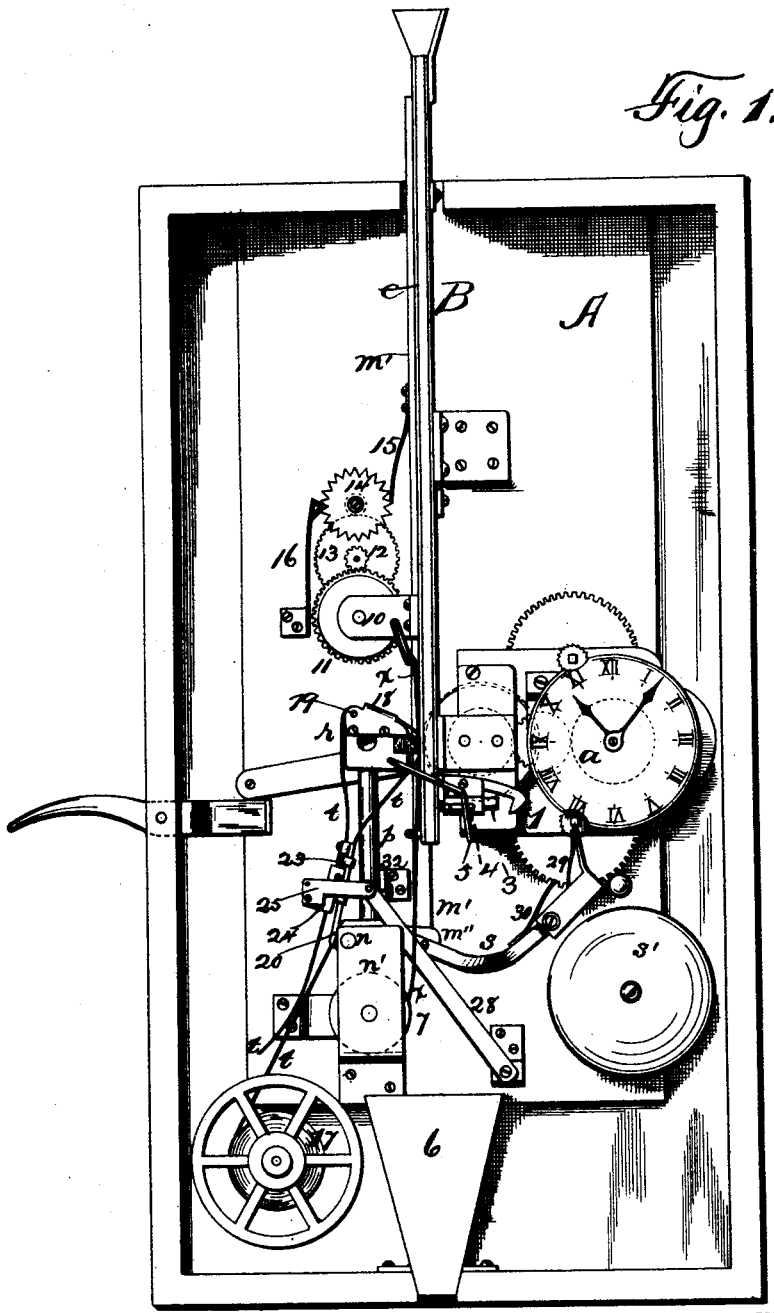

(No Model.) 6 Sheets—Sheet 1.

W. L. BUNDY.
WORKMAN'S TIME RECORDER.

No. 482,293. Patented Sept. 6, 1892.

WITNESSES:
H. A. Carhart
H. W. Bates

INVENTOR,
Willard L. Bundy
BY
Smith & Denison
his ATTORNEYS (No Model.) 6 Sheets—Sheet 2.

W. L. BUNDY.
WORKMAN'S TIME RECORDER.

No. 482,293. Patented Sept. 6, 1892.

WITNESSES:
INVENTOR.
Willard L. Bundy
BY
his ATTORNEYS

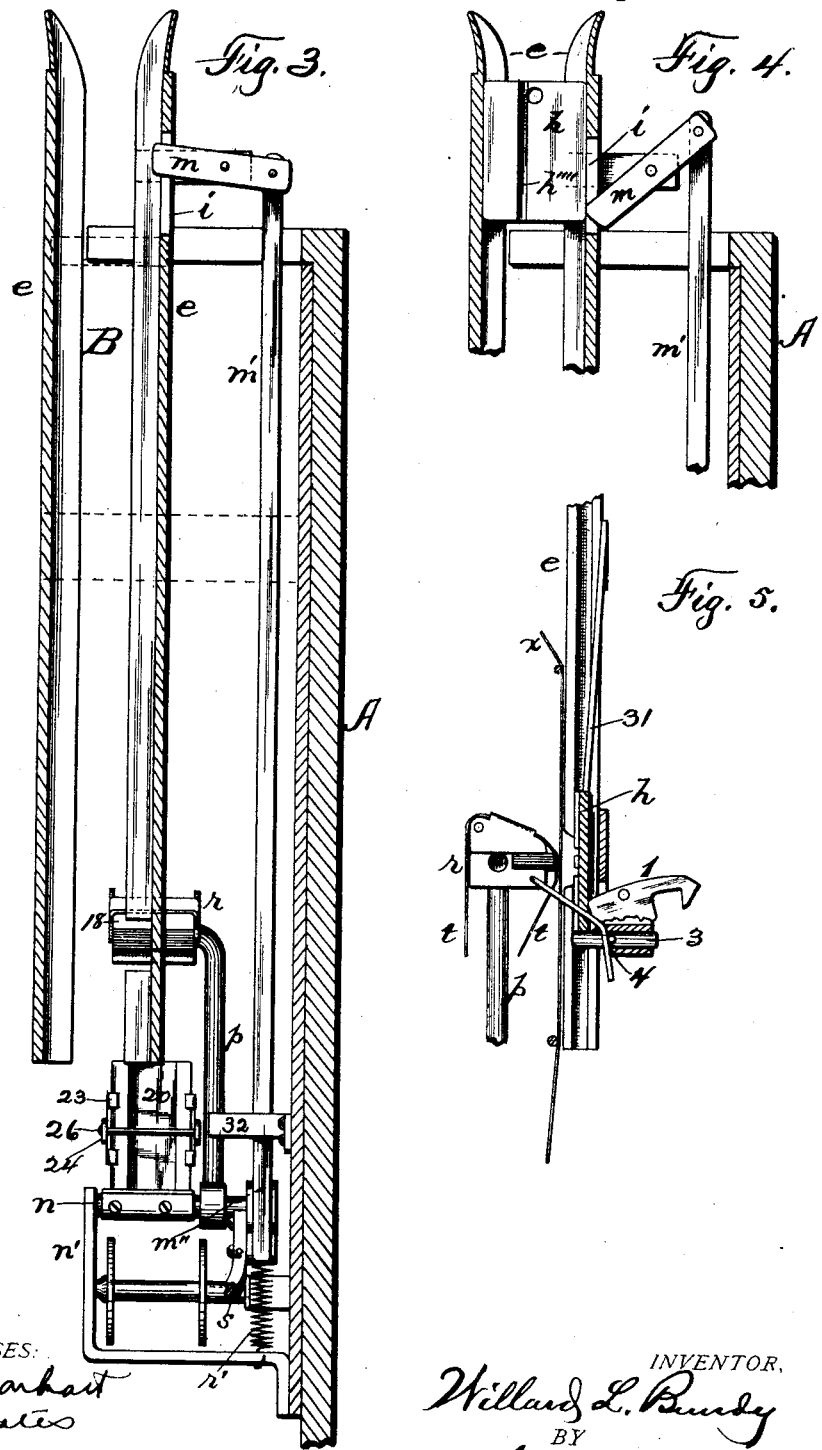

(No Model.) 6 Sheets—Sheet 4.
W. L. BUNDY.
WORKMAN'S TIME RECORDER.
No. 482,293. Patented Sept. 6, 1892.
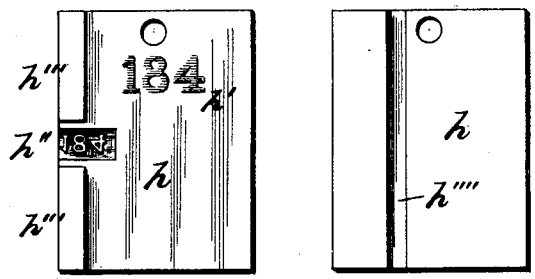
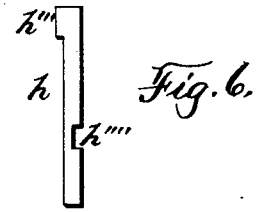
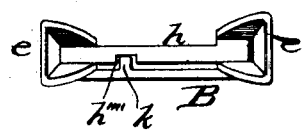
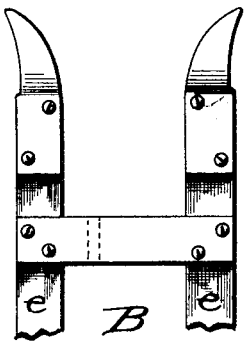
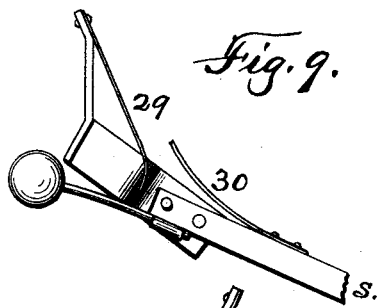
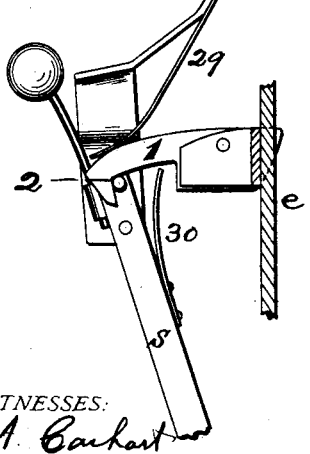
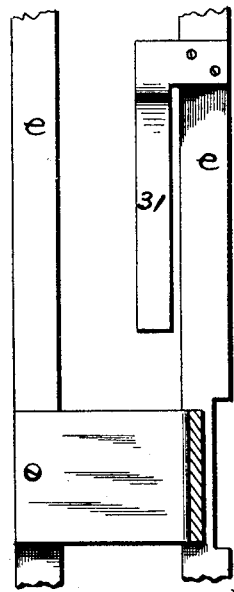
WITNESSES:
H. A. Carhart
H. E. Bates
INVENTOR.
Willard L. Bundy
BY
Smith & Denison
his ATTORNEYS (No Model.) 6 Sheets—Sheet 5.
W. L. BUNDY.
WORKMAN'S TIME RECORDER.
No. 482,293. Patented Sept. 6, 1892.
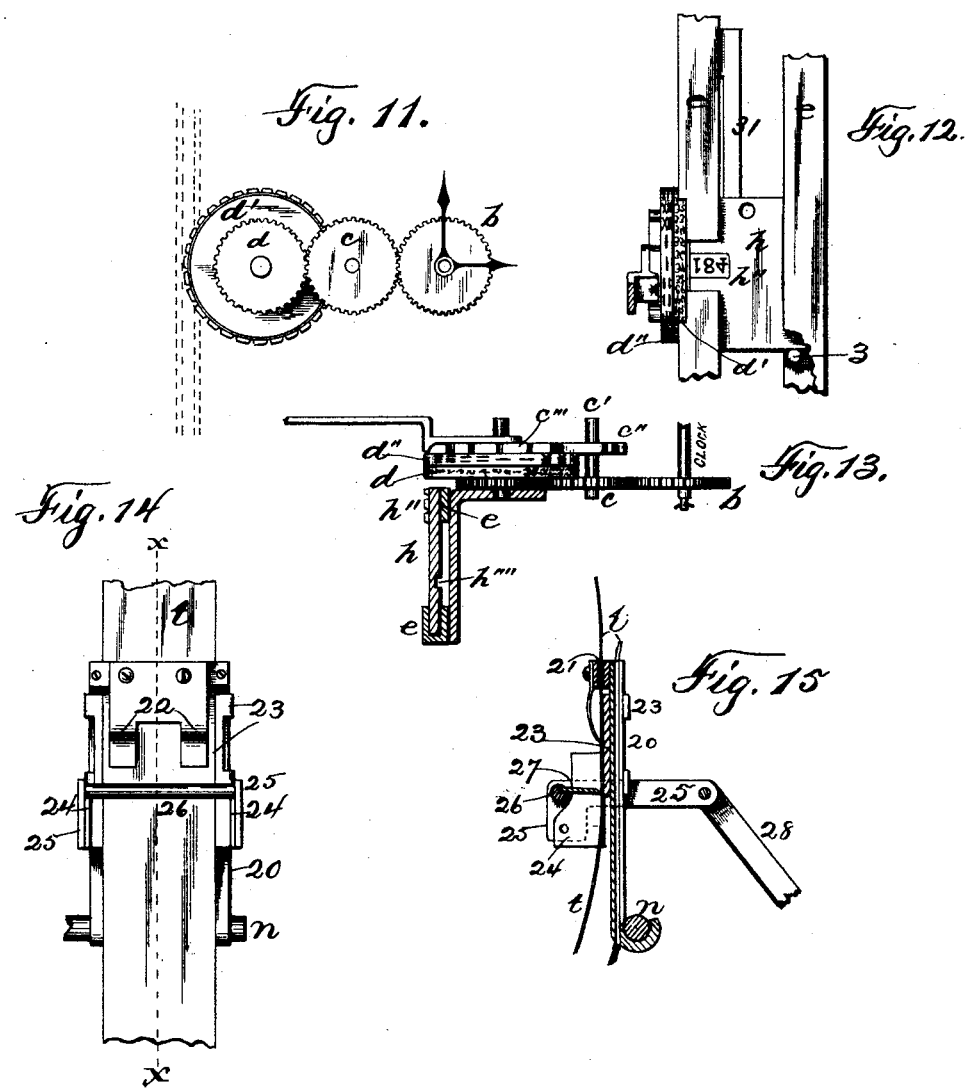
WITNESSES:
H. A. Carhart
H. W. Bates
INVENTOR,
Willard L. Bundy
BY
Smith & Denison
his ATTORNEY (No Model.) 6 Sheets—Sheet 6.

W. L. BUNDY.
WORKMAN'S TIME RECORDER.

No. 482,293. Patented Sept. 6, 1892.

WITNESSES:
H. A. Carhart
G. M. Blowers

INVENTOR.
Willard L. Bundy
BY
Smith & Denison
his ATTORNEYS

UNITED STATES PATENT OFFICE.

WILLARD L. BUNDY, OF BINGHAMTON, NEW YORK, ASSIGNOR TO THE BUNDY MANUFACTURING COMPANY, OF SAME PLACE.

WORKMAN'S TIME-RECORDER.

SPECIFICATION forming part of Letters Patent No. 482,293, dated September 6, 1892.

Application filed March 3, 1892. Serial No. 423,607. (No model.)

*To all whom it may concern:*

Be it known that I, WILLARD L. BUNDY, of Binghamton, in the county of Broome, in the State of New York, have invented new and useful Improvements in Workmen's Time-Recorders, of which the following, taken in connection with the accompanying drawings, is a full, clear, and exact description.

My invention relates to workmen's time-recorders; and my object is to simplify the construction and increase the efficiency thereof and to produce a time-recorder in which the printing mechanism is actuated or set by the introduction of a flat check provided with suitable printing characters in relief into a vertical chute; in which the check as it falls through the chute trips the printing alarm mechanism when it reaches the point therein which brings the characters thereon in the printing-line, which is in line with the time-wheels; in which the check is held at the printing-point until the impression is made; in which the check is released simultaneously with the making of the impression and by the impression mechanism; in which the check-holder is set to catch the check by the mechanism which is actuated by the introduction of the check; in which the printing-platen also carries the paper strip and is fed by a mechanism actuated by the vibratory movements of the platen, and in which the ribbon-feed mechanism is actuated by the introduction of the check.

My invention consists in the several novel features, elements, and mechanisms which are hereinafter described, and which are specifically set forth in the claims hereto annexed. It is constructed as follows, reference being had to the accompanying drawings, in which—

Figure 2:
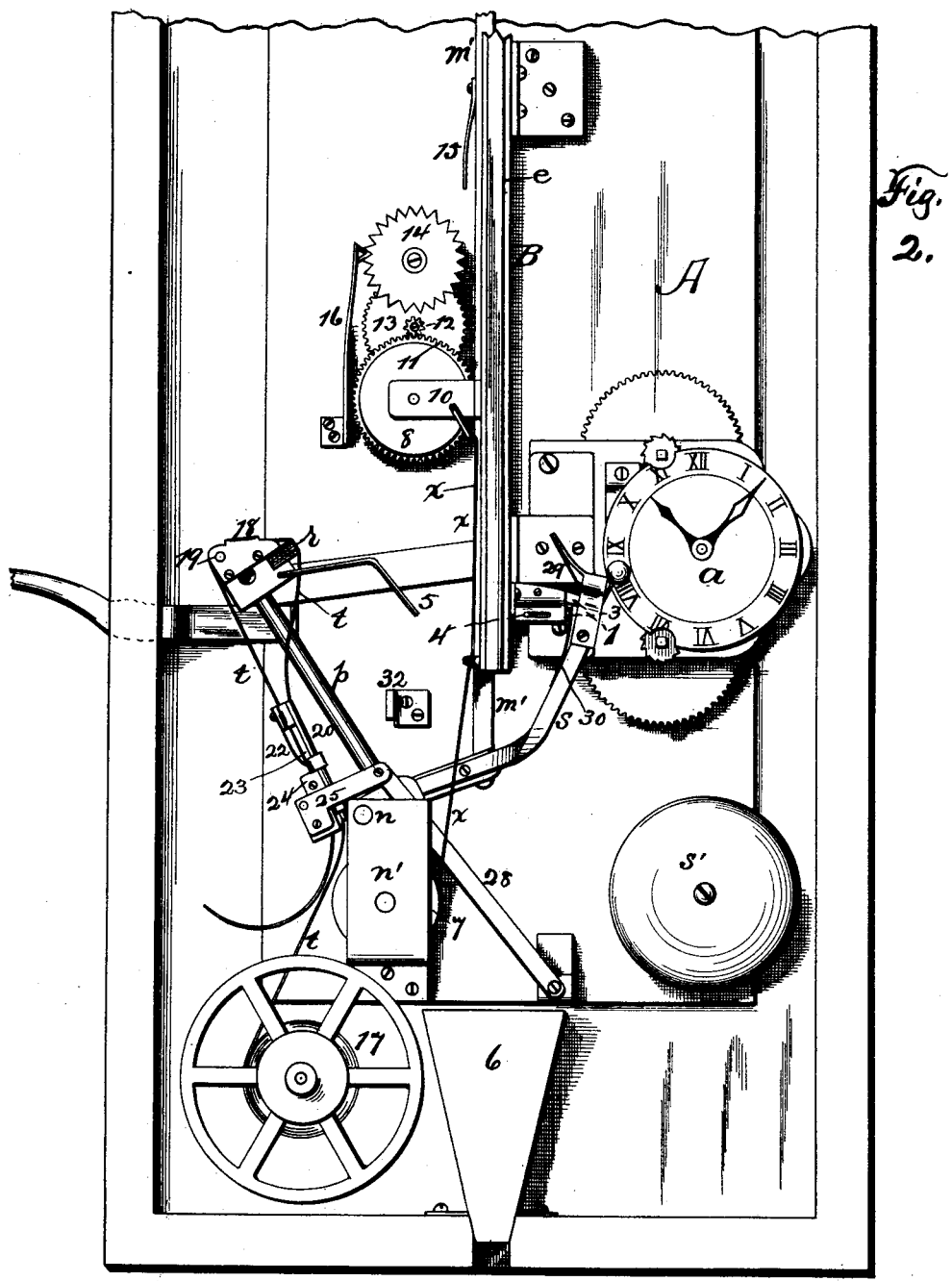
Figure 16:
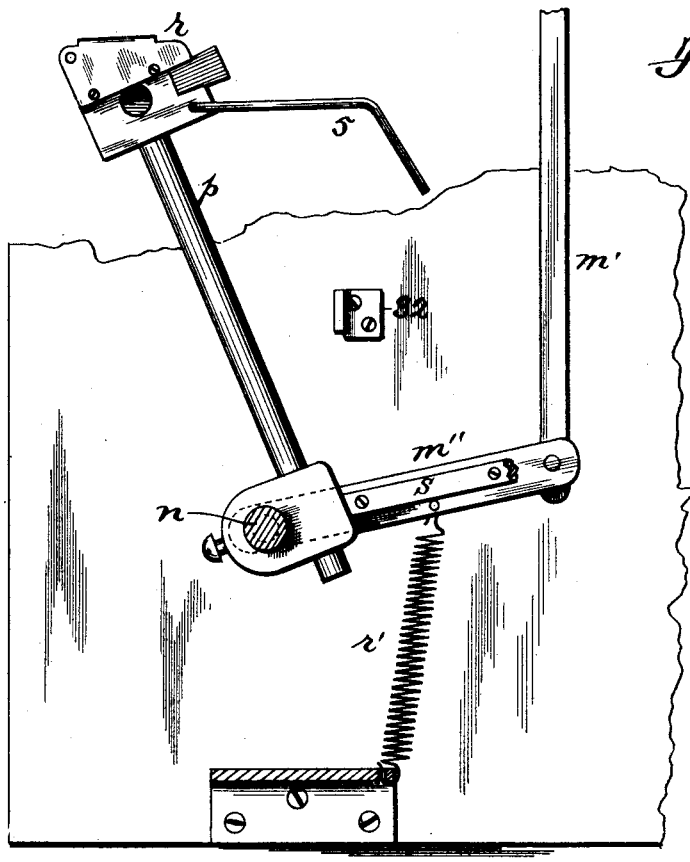
Figure 17:
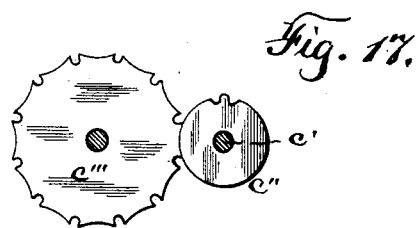

Figure 1 is a front elevation of the recorder complete in its case, the door being removed, everything being in its normal position ready for the introduction of the check. Fig. 2 is a like view of the same, showing the printing and alarm mechanism set ready by the introduction of the check into the chute and ready to be tripped by the dropping of the same onto the trip. Fig. 3 is a vertical sectional elevation of the check-chute ready for the introduction of the check and an elevation of the impression and paper-feed mechanism as viewed from the right in Fig. 1. Fig 4 is a sectional detail of the top of the check-chute, showing the check partially introduced and in engagement with the lever by which the impression and alarm mechanisms are set and in the position it assumes at the moment when they are so set. Fig. 5 is a sectional detail of the check-chute, the catch which holds the impression and alarm mechanisms in their position when set, the slide which supports the check at the printing-line, the impression-platen, ink-ribbon, and paper strip. Fig. 6 shows the check in front elevation, in rear elevation, and in top plan, respectively. Fig. 7 is a top plan of the check-chute and the check inserted therein. Fig. 8 is an elevation of the check-chute looking from the right in Fig. 1. Fig. 9 is a rear elevation of part of the arm which carries the alarm-hammer and the mechanism thereon. Fig. 10 is a like view of the same, showing the setting-catch in engagement therewith. Fig. 11 is a plan of the train of gearing which actuates the time-wheels. Fig. 12 is a front elevation of part of the check-chute, the check therein, and the time-wheels. Fig. 13 is a sectional detail of the check-chute and the check therein and a top plan of the time-wheels and the gearing actuating them synchronous with the clock. Fig. 14 is an elevation of the paper-feed mechanism looking from the left in Fig. 1. Fig. 15 is a sectional elevation of the same on line $x\ x$, Fig. 14. Fig. 16 is a detail, enlarged, of the crank-arm connected to the platen-carrying bar and the rod actuating it. Fig. 17 is a front elevation of the time-wheels shown in top plan in Fig. 13.

A is the casing, and $a$ is an ordinary clock mechanism, upon the hour-hand part of which the gear $b$ is mounted, in engagement with the gear $c$, which is in engagement with the gear $d$ upon the side of the time-wheel $d'$, indicating the minutes by the number upon its periphery.

The gear $c$ is mounted upon the shaft $c'$, which also carries a gear $c''$, in differential engagement with the gear $c'''$ upon the side of the hour-wheel $d''$, the gear $c''$ having one tooth and the gear $c'''$ having twelve, so that every full rotation of the gears $c$ and $c''$ rotates the gear $c'''$ and the hour-wheel the distance of a single tooth on the gear $c'''$ on one hour upon the hour-wheel.

B is the check-chute, consisting of two parallel bars grooved longitudinally and mounted in an upright position in the casing and extending through its top, and $h$ is the check, which is of such width and thickness as to fit loosely in the chute. This check consists of a plate of metal provided upon its front face with a designating-number $h'$ and at one side with a raised or embossed printing-number $h''$, the rib $h'''$ on that edge being broken away, as shown, and upon the back provided with a longitudinal guide-groove $h''''$. A short vertical fin or rib $k$ is secured on one side of the chute and projects into it, and when the check is inserted it fits into the guide-groove on the back thereof and guides it, and also insures the proper insertion of the check with the printing-number on the proper side.

A slotway $i$ is cut in one side of the check-chute, and a pivotally-mounted lever $m$ projects through it into the check-chute, so that the edge of the check engages with it and pushes that end down as the check is pushed into the chute, as shown in Fig. 4, and this raises the connecting-rod $m'$, the lower end of which is connected to the crank-arm $m''$, which is secured upon the rock-shaft $n$, which is journaled in the frame $n'$ and the back of the casing, as shown in Fig. 3. The arm $p$ is also secured upon said shaft and upon its upper end carries the impression-platen $r$, so that when the connecting-rod $m'$ is pulled up, as aforesaid, it partially rotates the shaft $n$ and throws the platen away from the side of the chute, as shown in Fig. 2, and $r'$ is the retracting-spring which gives the impulse to the platen to strike a quick blow to make an impression. Upon the crank $m''$ an arm $s$ is secured, carrying a hammer upon its outer end, and therefore when the rod $m'$ is raised, as aforesaid, said hammer is raised away from the bell $s'$ and the spring $r'$ causes it to strike a single blow upon the bell. Upon an arm upon the side of the check-chute I pivot a hook 1, the opposite end of which projects into the check-chute, Fig. 10, so that the dropping check strikes it and depressing this end raises the hook, Fig. 5. When the rod $m'$ is raised and the arm $s$ with it, the hook 1 engages with the pin 2 upon this arm, Fig. 10, and this holds the platen and hammer in the position shown in Fig. 2. Then when the check drops and throws up said hook out of its engagement with said pin both the platen and hammer are released to make the impression and give the alarm. When the check has thus unlocked the platen and hammer, it rests upon the sliding stop 3, and the figures $h''$ thereon are then in the printing-line. This stop is suitably mounted alongside of the hook 1 and is provided with a slide-pin 4, which extends out beyond the edge of the chute, and an arm 5, secured to the platform, Figs. 1 and 2, is adapted to engage with this pin just as the platen is making an impression and force said stop back and release the check, which then drops from the chute into a receiver 6.

The ink-ribbon $x$ is wound upon the spool 7, journaled in the frame $n'$, and the reel 8, which is secured upon a shaft 9, journaled in a bracket 10, secured upon the chute and in the back of the case. A gear 11 is secured upon this shaft, meshing with the pinion 12, secured upon the gear 13, which meshes with a pinion (not shown) secured upon the shaft which carries the star-wheel 14.

An arm 15 is secured upon the rod $m'$ and is raised therewith when the check is inserted, and then when the rod is retracted, as aforesaid, the end of said arm will engage with a tooth of the star-wheel and rotate it one tooth, and thus through the train of gearing rotate the reel to wind the ribbon thereon from the spool and feed it. A spring-pawl 16 engages with the teeth of said star-wheel.

A paper-reel 17 is mounted in the bottom of the case, and the paper strip $t$ extends from it up through the paper-chute, across the face of the platen, through a loop 18 across its top, over a roller across its back corner, mounted upon a shaft 19, and thence down through the sliding feed mechanism. The paper-chute 20 is simply a flat tube of metal secured upon the rock-shaft $n$.

The feed mechanism comprises a loop 21 on the side of the chute, through which the paper passes, fingers 22, secured thereon, the toothed ends of which engage with the paper, a plate 23, having part of its edges bent around the edges of the paper-chute and free to slide thereon, side walls 24, formed by bending the lower edges of said plate outward, a frame 25, pivotally mounted upon these walls and provided with a cross-beam 26, bearing a grip-plate 27, Fig. 15, secured thereto, and a rod 28, pivotally connected to one corner of the frame and to the back of the case. Then when the rock-shaft $n$ is rotated, as aforesaid, the rod 28 will first cause the frame to rock upon the slide 23, bringing said grip against the paper and gripping it against the slide, and as the movement continues said rod will draw the slide down, pulling the paper with it, and when the platen strikes the blow the grip is released from the paper and held by the fingers 22 against retraction.

Upon the hammer-bar I mount a spring 29 in such manner that it will bear upon the hook 1 when it is in engagement with the pin 2 and hold it in engagement, as shown in Fig. 10. Upon the hammer-bar I also secure a spring 30 in such manner that when the hammer-arm is raised by the introduction of the check it will come into contact with the check-stop 3 and force it into position to operate as a stop, as shown in Fig. 5 and also in Fig. 2.

A spring 31 is secured upon the check-chute, with its lower end projecting into it in such manner that a check will readily pass it downward; but after it has been sprung out above the check the latter cannot be withdrawn, then being beyond the control of the workman. This also prevents fraud by a workman and false registering, as could be done without this spring-finger in that he could attach a wire or cord to the check, drop it down to the printing-point, make the impression from it, and then pull it back out through the top of the chute. An arm 32 is secured upon the back of the case, and it projects outwardly in such manner that the platen-arm $p$ engages with or strikes against it in such a way as to cause said arm after it has been set and released, as aforesaid, to spring forward and strike an impression blow and then rebound and throw the platen away from the printing-line.

What I claim as my invention, and desire to secure by Letters Patent, is—

1. In a workman's time-recorder, a check, in combination with a check-chute, a lever projecting into it, a rod connected to said lever, a rock-shaft, and a crank-arm thereon to which said rod is connected.

2. In a workman's time-recorder, a check, in combination with a check-chute, a lever projecting into it, a rod connected to said lever, a rock-shaft, a crank-arm thereon to which said rod is connected, and an impression-platen mounted upon an arm secured to said rock-shaft.

3. In a workman's time-recorder, a check, in combination with a check-chute, a lever projecting into it, a rod connected to said lever, a rock-shaft, a crank-arm thereon to which said rod is connected, a hammer-rod secured to said crank-arm, and a bell.

4. In a workman's time-recorder, a check, in combination with a check-chute, a lever projecting into it, a rod connected to said lever, a rock-shaft, a crank-arm thereon to which said rod is connected, an impression-platen mounted upon an arm secured to said rock-shaft, a hammer-rod secured to said crank-arm, and a bell.

5. The combination, with the impression-platen, of a rock-shaft to which it is connected and means to rotate said crank-shaft, actuated by the insertion of a check into the check-chute.

6. The combination, with the impression-platen and the hammer-rod and bell, of a rock-shaft to which they are connected and means to rotate said shaft by the insertion of a check into the check-chute.

7. In a workman's time-recorder, a rock-shaft, an impression-platen connected thereto, a hammer-rod also connected thereto, and means to rotate said shaft, and a check-chute, in combination with a trip-hook mounted upon said chute and adapted to engage with a pin upon said hammer-rod when said rock-shaft is rotated.

8. In a workman's time-recorder, a rock-shaft, an impression-platen connected thereto, a hammer also connected thereto, and means to rotate said shaft, and a check-chute, in combination with a trip mounted upon said chute and provided with a hook upon one end, adapted to engage with said hammer-rod when said rock-shaft is rotated, and having a trip-arm upon the other end, projecting into the chute and with which a check engages to disengage said hook.

9. In a workman's time-recorder, a rock-shaft and means to rotate it and an impression-platen connected thereto and provided with a lateral arm, in combination with a sliding stop adapted to project into the check-chute and with which said arm is adapted to engage to withdraw it from the chute.

10. In a workman's time-recorder, a rock-shaft, a hammer-rod connected thereto, and a spring-finger thereon, in combination with a sliding stop with which said finger engages when said rock-shaft is rotated.

11. In a workman's time-recorder, a check-chute, a check, a ribbon-reel mounted upon a shaft, and a train of gearing operatively connected to said shaft, in combination with a vertically-movable rod and a finger thereon adapted to engage with the terminal gear when said rod is operated by the passage of the check through the chute.

12. In a workman's time-recorder, a rock-shaft, a paper-chute secured thereto, a slide upon said chute, a rocking frame mounted upon said slide, a grip upon said frame, and means to rock said frame when said shaft is rotated, in combination, as set forth.

13. In a workman's time-recorder, a clock, time-wheels synchronous therewith, a rock-shaft, and an impression-platen connected thereto and actuated thereby, in combination with a check-chute, a rod connected to said rock-shaft, a lever connected to said rod and projecting into the check-chute, and a check operatively engaging with said lever to rotate said shaft when inserted into said chute.

14. In a workman's time-recorder, a check, a check-chute, and a sliding stop holding the check upon the printing-line, in combination with an impression-platen thrown away from the chute by the insertion of the check into the chute and an arm upon the platen engaging said stop to release said check at the same moment that the impression blow is given by the platen.

In witness whereof I have hereunto set my hand this 13th day of February, 1892.

WILLARD L. BUNDY.

In presence of—
HOWARD P. DENISON,
C. W. SMITH.